United States Patent Office 3,339,943
Patented Sept. 5, 1967

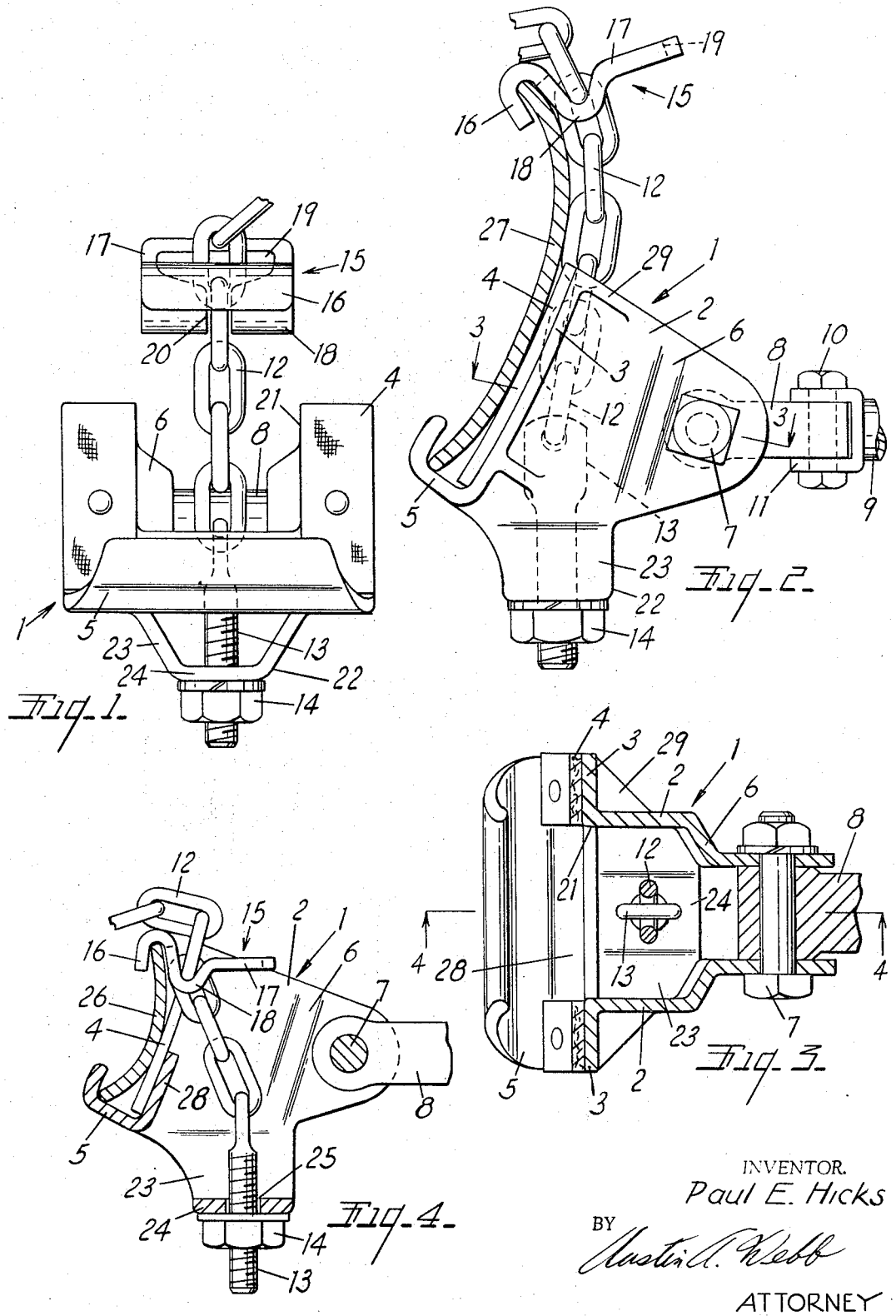

3,339,943
COUPLING HEAD FOR ATTACHING TOWING CONNECTIONS TO AUTOMOBILE BUMPERS
Paul E. Hicks, Three Oaks, Mich., assignor to Pilot Incorporated, Battle Creek, Mich.
Filed Feb. 11, 1966, Ser. No. 526,869
7 Claims. (Cl. 280—502)

This invention relates to improvements in coupling head for attaching towing connections to automobile bumpers. The principal objects of this invention are:

First, to provide a coupling head which is attachable to automobile bumpers having a wide range of vertical widths and shapes.

Second, to provide a coupling head which is particularly adapted for attaching towing connections to small bumpers of small compact type automobiles.

Other objects and advantages of the invention will be apparent from the following description and claims. The drawings of which there is one sheet illustrate a highly practical form of the coupling head of the invention and its method of attachment to bumpers of two different sizes.

FIG. 1 is a front elevational view of the coupling head and its associated clamping chain and hook.

FIG. 2 is a fragmentary side elevational view of the coupling head of the invention clamped to a bumper of relatively wide vertical width and connected to a towing attachment to be towed from the bumper.

FIG. 3 is a fragmentary cross sectional view taken along the plane of the line 3—3 in FIG. 2.

FIG. 4 is a fragmentary vertical cross sectional view taken along the plane of the line 4—4 in FIG. 3, and showing the head clamped to a bumper of relatively narrow vertical width.

Coupling heads for towing attachments for automobiles are well known and have been provided with body portions having hooks which engage one edge of a bumper and a clamping bolt connected to a link chain with a hook adjustable along the link chain for engaging the opposite edge of the bumper. These coupling heads have connections thereon for various towing attachments and connections and have had faces on the body of the coupling head which bear against the face of the bumper to which they are attached.

The coupling head of the invention includes a body generally indicated at 1 having transversely spaced side walls 2 with laterally outwardly turned and rearwardly or inwardly facing flanges 3 adapted to bear against the face of the bumper. The flanges 3 are desirably provided with pads 4 of fabric or other non-marring materials. Integrally connected with the side walls 2 is a transversely extending hook portion 5 adapted to engage the edge of the bumper. The forward or outer edges of the side walls 2 are converged as at 6 and provided with connecting means for connecting the body to a towing attachment. In the example illustrated the connecting means consists of a horizontal or transverse bolt 7 pivotally connecting a towing link 8 to the head. The towing link may in turn be connected to a tow bar 9 by a vertical pivot pin 10 passed through the yoke 11 on the towing bar.

The body is clamped to a bumper by means of a loop link chain 12 having one end link connected to a clamping bolt 13 passed through the bottom of the head and adapted to be drawn tight by a nut 14 on the bolt. A clip indicated generally at 15 is adjustable along the chain to permit the attachment of the coupling head to bumpers of varying vertical widths and shapes. The clip 15 includes a hook portion 16 engageable with the opposite edge of the bumper from the hook 5 on the body, and a tail portion 17 that is reversely bent as at 18 oppositely to the hook 16. The tail portion 17 and the reversely bent portion 18 define a key-hole shaped opening 19 that is large at the outer end of the tail portion and which converges to a narrow slot 20 in the reversely bent portion 18. Hooks of this type are old and function in a well known manner to pass the loops of the chain 12 through the enlarged portion of the key-hole opening until a selected link may be seated in the reversely bent portion 18 on opposite sides of the narrow slot 20.

The coupling head of the invention is characterized by the fact that the inwardly facing, bumper engaging portions of the body are formed by the flanges 3 which are spaced transversely from each other so as to define a slot or opening 21 into which the adjustable hook or clip 15 may be extended to position the clip and its hook 16 in closer proximity to the hook 5 on the body. The coupling head is further characterized by the fact that the bottom of the body is formed by an upwardly opening U-shaped portion 22 having side flanges or walls 23 connected to the lower edges of the side walls 2 of the body and extending downwardly below the body and below the hook 5 to the cross piece 24 which defines the hole 25 passing the bolt 13. This relationship permits the upper end of the bolt 13 to be drawn downwardly below the upper edge of the hook 5 so that the adjustable hook clip 15 can be engaged with the upper edge of a relatively narrow bumper as shown at 26 in FIG. 4 while the hook 5 of the body is engaged with the lower edge of the bumper.

At the same time the adjustable clip 15 may be engaged with a link of the chain more remote from the clamping bolt to engage the upper edge of a bumper as indicated at 27 in FIG. 2.

The side walls 2 extend rearwardly or outwardly from the flanges 3 which oppose the bumper and also extend downwardly and are integrally connected to the front wall 28 of the hook portion 5 of the body. Desirably stiffening fillet flanges 29 connect the outer edges of the flanges 3 with the side walls 2 and the upwardly extending sides 23 of the U-shaped cross-piece or portion 22 are connected to the bottoms of the side walls 2 and to the outer portion 28 of the hook 5. The body as disclosed is particularly adapted to be formed as a casting so that the hook 5, side walls 2, flanges 3, and the lower cross member or bottom 22 of the head are all integrally connected. The connection of the side walls 2 of the body to the opposed inner edges of the flanges 3 is a desirable relationship in that it places the side walls more directly and more closely aligned with the towing connection 7 and reduces the over-all size and weight of the body but it is the lateral spacing of the flanges 3 and the consequent formation of the opening 21 therebetween to receive the hook clip 15 which is a necessary feature of the coupling head. The downwardly offset relationship of the cross-piece or bottom 22 of the body coacts with the spacing of the flanges 3 in permitting the lower end of the chain and the adjusting hook clip 15 to be drawn down into the vertical height of the body for engagement with small bumpers. The clamping bolt 13 and the chain 12 can thus be made of substantial size and strength to clamp the head to the bumper with sufficient strength to tow substantial loads when applied to a large bumper while still being capable of engagement with a small bumper which might not have sufficient strength in itself to pull the largest load which the coupling head is capable of pulling.

What is claimed as new is:

1. A coupling head for clamping a towing attachment to an automobile bumper and including a body with a transversely extending hook portion engageable with an edge of a bumper, a loop link chain having one end connected to the end of a tightening bolt, and an adjusting clip having a hooked end engageable with another edge of the bumper and a reversely bent tail portion with a key hole slot opening formed therein and selectively engageable with links of said chain, said head being characterized by said body having spaced side walls extending outwardly and upwardly from said hook portion, means forming part of a towing connection connected to the outer ends of said side walls, transversely extending and spaced flanges on the inner edges of said side walls having their adjacent edges spaced to receive said bent tail portion of said clip therebetween, and an upwardly opening U-shaped cross portion connecting the lower edges of said side walls and extending below said hook portion, the bottom of said U-shaped cross portion having a hole formed therethrough passing said bolt and acting as an abutment for a clamp nut on the projecting lower end of said bolt.

2. A coupling head as defined in claim 1 in which said spaced flanges are extended transversely outwardly from said side walls.

3. A coupling head as defined in claim 1 in which the inner edges of the sides of said U-shaped cross portion have their upper ends connected to the outer side of said hook portion.

4. A coupling head as defined in claim 2 in which the inner edges of the sides of said U-shaped cross portion have their upper ends connected to the outer side of said hook portion.

5. A coupling head as defined in claim 2 in which said hook portion and said spaced flanges and said cross portion are integrally cast elements.

6. A coupling head as defined in claim 1 in which said hook portion and said spaced flanges and said cross portion are integrally cast elements.

7. A coupling head as defined in claim 3 in which said hook portion and said spaced flanges and said cross portion are integrally cast elements.

References Cited

UNITED STATES PATENTS

| | | | |
|---|---|---|---|
| 2,668,064 | 2/1954 | Bolling | 280—502 |
| 2,693,369 | 11/1954 | Gross | 280—502 |
| 3,061,333 | 10/1962 | Sudeikis | 280—502 X |

BENJAMIN HERSH, *Primary Examiner.*

C. C. PARSONS, *Assistant Examiner.*